United States Patent [19] [11] 4,098,672
Riley [45] Jul. 4, 1978

[54] POROUS DIAPHRAGMS

[75] Inventor: David Stephen Riley, Tollerton, England

[73] Assignee: Imperial Chemical Industries Limited, London, England

[21] Appl. No.: 657,704

[22] Filed: Feb. 12, 1976

Related U.S. Application Data

[63] Continuation of Ser. No. 484,935, Jul. 1, 1974, abandoned.

[30] Foreign Application Priority Data

Jul. 18, 1973 [GB] United Kingdom ............ 484935/73

[51] Int. Cl.$^2$ ........................ C25B 13/04; B29D 27/00
[52] U.S. Cl. ........................................ 204/296; 264/49
[58] Field of Search ............................ 204/296; 264/49

[56] References Cited

U.S. PATENT DOCUMENTS

| | | | |
|---|---|---|---|
| 508,084 | 11/1893 | Breuer | 204/296 |
| 2,293,928 | 8/1942 | Beal | 204/296 X |
| 2,542,527 | 2/1951 | Honey et al. | 264/49 |
| 2,592,686 | 4/1952 | Groombridge et al. | 204/72 |
| 2,860,096 | 11/1958 | Juda et al. | 204/296 X |
| 2,967,806 | 1/1961 | Osborne et al. | 204/72 |
| 3,556,161 | 1/1971 | Roberts | 264/49 X |
| 3,718,561 | 2/1973 | Jacob | 204/180 R |

FOREIGN PATENT DOCUMENTS

| | | | |
|---|---|---|---|
| 1,491,033 | 8/1967 | France | 204/296 |
| 1,144,357 | 2/1963 | Fed. Rep. of Germany. | |
| 1,174,973 | 7/1964 | Fed. Rep. of Germany. | |
| 2,139,646 | 2/1972 | Fed. Rep. of Germany. | |
| 1,124,362 | 8/1968 | United Kingdom. | |

*Primary Examiner*—F.C. Edmundson
*Attorney, Agent, or Firm*—Cushman, Darby & Cushman

[57] ABSTRACT

A process for the manufacture of a porous diaphragm of a synthetic material, especially polytetrafluoroethylene, which comprises forming a sheet of the synthetic material in admixture with a solid particulate additive (eg starch) to be removed therefrom, introducing said sheet into an electrolytic cell, filling the cell with the working electrolyte and removing the solid particulate in situ in the cell by electrolysing the said electrolyte. The porous diaphragms are especially suitable for use in diaphragm cells for the production of chlorine wherein the working electrolyte is sodium chloride brine.

31 Claims, No Drawings

POROUS DIAPHRAGMS

This is a continuation of application Ser. No. 484,935, filed July 1, 1974, now abandoned.

This invention relates to the manufacture of porous diaphragms.

More particularly, the invention relates to the manufacture of porous diaphragms based on polytetrafluoroethylene. Such diaphragms are especially suitable for use in cells electrolysing alkali metal chloride solutions.

In the specification of our U.K. Pat. No. 1,081,046 there is described a method of manufacturing such porous diaphragms which comprises forming an aqueous slurry or dispersion of polytetrafluoroethylene and a solid particulate additive such as starch, adding an organic coagulating agent such as acetone to said dispersion and then drying the coagulated dispersion. An organic lubricant such as petroleum ether is then added to the dried coagulated material to serve as a processing aid when the material is being rolled into a sheet. On completion of the rolling operation the starch is removed to give the desired porous diaphragm. The lubricant can also be removed if required.

An improved method of manufacturing porous diaphragms in which the organic lubricant is replaced by water as the lubricant is described in the specification of our copending Dutch Patent Specification No. 73/01516. This method comprises preparing an aqueous slurry or dispersion comprising polytetrafluoroethylene and a solid particulate additive, thickening said aqueous slurry or dispersion to effect agglomeration of the solid particles therein, forming from the thickened slurry or dispersion a dough-like material containing sufficient water to serve as lubricant in a subsequent sheet forming operation, forming a sheet of desired thickness from said dough and removing solid particulate additive from the sheet.

In each of the above methods the solid particulate additives are removed from the diaphragm prior to introducing the diaphragm into the cell. The particulate additives may be removed, for example, by soaking the diaphragm in an acid, preferably a mineral acid e.g. hydrochloric acid. The diaphragm is then washed with water to remove the acid and assembled, whilst wet, into a cell. It is necessary to keep the diaphragm wet during assembly in order to prevent collapse of the pores and this leads to considerable difficulties in handling since the diaphragm is both extremely wet and extremely slippery (the latter being due to the polytetrafluoroethylene).

Further disadvantages arising from the use of pre-extracted diaphragms, prepared as described above, include the difficulty of ensuring adequate tautness of the wet diaphragm whilst assembling in the cell unit, and the possibility of leakages occurring at the sealing gasket mounted along the wet edges of the diaphragm. We have now found that the above disadvantages and difficulties are obviated or mitigated by the method of the present invention in which the solid particulate additive is removed from the diaphragm in situ in the cell.

According to the present invention there is provided a process for the manufacture of a porous diaphragm of a synthetic material for use in an electrolytic cell which comprises forming a sheet of the synthetic material in admixture with a solid particulate additive to be removed therefrom, introducing said sheet into an electrolytic cell, filling the cell with the working electrolyte and removing solid particulate additive from the sheet in situ in the cell by electrolysing the said electrolyte.

The process according to the invention is especially applicable to the manufacture of porous diaphragms based on synthetic organic polymeric materials, for example polyvinylidene fluoride and more particularly polytetrafluoroethylene.

The process according to the invention may conveniently be carried out by assembling the unextracted diaphragm into the cell, filling the cell with the working electrolyte, for example an alkali metal chloride brine (for example sodium chloride brine) and switching on the current to commence electrolysis of the brine. The electrolysis may be carried out, for example, at the normal operating voltage of the cell, whence the initial current density will be lower than the normal operating current density (e.g. 0.5 $kA/m^2$ instead of the usual 2 $kA/m^2$ in the electrolysis of sodium chloride brine) owing to the greater voltage drop across the unextracted diaphragm as compared with the extracted diaphragm. Alternatively, the electrolysis may be carried out at the normal current density (e.g. 2 $kA/m^2$ in the electrolysis of brine) whence the initial voltages will be higher than the usual operating voltage (e.g. 4.0 to 4.5 volts instead of about 3 volts when electrolysing brine).

The electrolysis is preferably carried out at a reduced rate of feed, for example of sodium chloride brine, to the cell. Suitably, a brine flow corresponding to 10% to 30%, for example 20%, of the full design rate is maintained, and depleted brine is bled off to maintain a constant head of liquor in the anolyte side of the cell. Under these conditions, chlorine production is maintained during the extraction. In general, a low flow of liquor is produced through the diaphragm in a period of about 8 to 10 hours, and the cell is operating effectively in about 24 hours (for example at a current efficiency of 96 to 97% at about 9% conversion in a sodium chloride brine cell).

The process is preferably carried out by preheating the electrolyte in the cell before applying current to the cell; sodium chloride brine, for example, may be heated to 50° C to 60° C, for example 53° C to 55° C. This preheating treatment of the diaphragm is especially preferred when the solid particulate matter to be removed from the diaphragm is starch, since it is believed that such treatment causes gelatinisation of the starch.

Suitable solid particulate additives which may be removed from the diaphragms include starch, for example maize starch and/or potato starch, cellulose (as described in our copending Dutch Patent Specification No. 74/09610, cellulose acetate and water-insoluble bases or carbonates, for example calcium carbonate. It is believed that the removal of organic additives, for example starch, cellulose and cellulose acetate is brought about by the oxidation of the said organic additives by the chlorine produced during the electrolytic treatment according to the invention. It is further believed that the removal of the water insoluble-bases or carbonates, for example calcium carbonate, is brought about by the acidity which results in the vicinity of the diaphragm during the said electrolytic treatment.

The unextracted diaphragms may conveniently be prepared from aqueous slurries or dispersions of the synthetic material (for example polytetrafluoroethylene) and the solid particulate additive by the methods described in our U.K. Pat. No. 1,081,046 and in our copending Dutch Patent Specification No. 73/01516, referred to above.

When using polytetrafluoroethylene as the synthetic material for example, the preferred particle size of the polytetrafluoroethylene in the aqueous slurry or dispersion is in the range of 0.05 to 1 micron, for example to 0.2 micron.

Generally, the additive has a particle size substantially all of which are within the range of 5 to 100 microns. The amount of additive will depend on the permeability desired in the final diaphragm. Thus, the weight ratio of additive to polytetrafluoroethylene may be, for example, from 10:1 to 1:10 preferably from 5:1 to 1:1.

In many cases it is desirable to incorporate other components in the aqueous slurry or dispersion which are not removed when the sheet is subjected to the treatment to remove the particulate additive. Examples of such components include particulate filler generally inorganic fillers, for example, titanium dioxide which is particularly preferred, barium sulphate, asbestos, (for example amphibole or serpentine asbestos), graphite and alumina. Suitably the filler has a particle size of, for example, less than 10 microns and preferably less than 1 micron. The weight ratio of filler to the synthetic material, for example polytetrafluoroethylene may be for example from 10:1 to 1:10, preferably from 2:1 to 1:2.

The diaphragms produced by the process according to the invention are generally strong enough to be used without any support but for extra strength it may be desirable to incorporate a sheet of a suitable strengthening material, for example, a polymer gauze such as a polypropylene gauze.

The diaphragms thus produced are particularly suitable for use in electrolytic cells for the electrolysis of alkali metal halides, for the production of chlorine and caustic alkalies.

The invention is illustrated but not limited in the following Example in which all parts and percentages are by weight.

EXAMPLE

To 100 parts of an aqueous dispersion of polytetrafluoroethylene containing 60% of the polymer in the form of particles approximately all in the size range 0.15 to 0.2 micron were added 101 parts of water, 60 parts of titanium dioxide of particle size approximately 0.2 micron, 60 parts of maize starch of particle size approximately 13 microns and 120 parts of potato starch of particle size less than 75 microns. The mixture was then stirred with a paddle mixer for 30 minutes to form a substantially uniform paste. This paste was spread on trays and dried at 24° C for 48 hours to a water content 5.7% by weight. 100 parts of the resultant crumb were mixed with 52 parts of water to form a dough having a viscosity of $4 \times 10^6$ poise. The dough was then spread along the shortest edge of rectangular piece of card, and calendered on the card between dual, even-speed, calender rolls, set 3 mm apart, into an oblong sheet. After calendering, the oblong sheet was cut, in the direction of calendering, into four equal pieces. These were laid congruently over each other to obtain a four-layered laminate. The card was picked up, rotated 90° in the horizontal plane, and calendered (directed 90° to the original direction of calendering) again through the 3 mm roll separation. This process, the successive cutting into four, stacking, rotating and calendering was repeated until the composition had been rolled a total of five times. The resultant laminate was cut into four, in the direction of calendering, stacked, removed from the card, and calendered, without rotation through 90°, the inter-roll space being reduced by the thickness of the card. After calendering, the laminate was cut, at right angles to the direction of calendering, into four equal pieces, stacked, rotated through 90° and calendered again. This process, cutting right angles to the direction of calendering, stacking, rotating and calendering was repeated until the composition had been rolled a total of nine times. The resultant essentially rectangular laminate was then passed through the rolls with its largest side directed at 90° to the direction of calendering and with the inter-roll space slightly reduced, no cutting, stacking or rotating through 90° being involved. This process was repeated through a gradually reduced inter-roll space, the same edge of the laminate being fed to the rolls on each occasion, until the thickness of the laminate was 1.5 mm. A square of 22 × 26 mesh gauze woven of 0.011 inch diameter monofilament polypropylene yarn was placed on top of the laminate, and rolled into the liminate by calendering through a slightly reduced inter-roll space.

The resultant reinforced sheet was removed from the rolls and assembled into an electrolytic cell. The cell was filled with sodium chloride brine at 60° C and allowed to stand for 1 hour. After 1 hour the current was switched on to commence electrolysis of the brine. Initial voltage was 4.1 volts at 2 $kA/m^2$. At this stage there was no flow through the sheet. After 2 laminate hours on load, cell voltage had dropped to its usual value of 3.0 volts at 2 $kA/m^2$. Flow through the diaphragm commenced after 10 hours, and after 18 hours had reached its design value. Removal of starch from the sheet could be followed by analysis of carbon dioxide in the gaseous chlorine. From an initial level of 7% carbon dioxide concentration decreased steadily until after 18 hours it was constant at 0.5%, the level attributable to excess carbonate in feed brine, thus indicating that oxidation of starch was complete. After 24 hours, satisfactory cell operation at a current efficiency of 96.5% at 10% conversion was achieved.

What we claim is:

1. A process for the manufacture of a porous diaphragm of a synthetic material for use in an electrolytic cell which comprises forming a sheet of the synthetic organic polymeric material selected from the group consisting essentially of polytetrafluoroethylene and polyvinylidene fluoride in admixture with a solid particulate additive to be removed therefrom, assembling said sheet into an electrolytic cell, filling the cell with the working electrolyte and removing solid particulate additive from the sheet in situ in the cell by electrolysing the said electrolyte, said additive being insoluble in said electrolyte.

2. A process as claimed in claim 1 comprising electrolysing at the normal operating voltage of the cell.

3. A process as claimed in claim 1 comprising electrolysing at the normal current density of the cell.

4. A process as claimed in claim 1 comprising electrolysing at a reduced rate of feed of electrolyte as compared with the normal electrolyte flow in the cell whilst maintaining a constant head of liquor in the anolyte side of the cell.

5. A process as claimed in claim 4 wherein the electrolytic flow is 10% to 30% of the full design rate.

6. A process as claimed in claim 5 wherein the electrolyte flow is 20% of the full design rate.

7. A process as claimed in claim 1 wherein the electrolyte is preheated in the cell before applying current to the cell.

8. A process as claimed in claim 7 wherein the electrolyte is preheated to 50° C to 60° C.

9. A process as claimed in claim 1 wherein the sheet of the synthetic material is formed in admixture with the solid particulate additive by preparing an aqueous slurry or dispersion comprising the synthetic material and the solid particulate additive, thickening said aqueous slurry or dispersion to effect agglomeration of the solid particles therein, forming from the thickened slurry or dispersion a dough-like material containing sufficient water to serve as lubricant in a subsequent sheet forming operation, and forming a sheet of desired thickness from said dough.

10. A process as claimed in claim 1 wherein the sheet of the synthetic material is formed in admixture with the solid particulate additive by preparing an aqueous slurry or dispersion comprising the synthetic material and the solid particulate additive, adding an organic coagulating agent to said dispersion, drying the coagulated dispersion, adding an organic lubricant to the dried coagulated material to serve as a lubricant in a subsequent sheet forming operation, and forming a sheet of the desired thickness from the coagulated material.

11. A process as claimed in claim 10 wherein the particle size of the polytetrafluoroethylene in the aqueous slurry or dispersion is in the range of 0.05 to 1 micron.

12. A process as claimed in claim 11 wherein the particle size of the polytetrafluoroethylene is in the range 0.1 to 0.2 micron.

13. A process as claimed in claim 10 wherein the solid particulate additive has a particle size substantially within the range 5 to 100 microns.

14. A process as claimed in claim 10 wherein the ratio of solid particulate additive to polytetrafluoroethylene is 10:1 to 1:10.

15. A process as claimed in claim 14 wherein the ratio of solid particulate additive to polytetrafluoroethylene is 5:1 to 1:1.

16. A process as claimed in claim 10 wherein the aqueous slurry or dispersion comprises other components which are not removed when the sheet is subjected to the treatment to remove the particulate additive.

17. A process as claimed in claim 16 wherein said other component is an inorganic filler.

18. A process as claimed in claim 17 wherein the inorganic filler is titanium dioxide, barium sulphate, asbestos, graphite or alumina.

19. A process as claimed in claim 16 wherein said other component has a particle size less than 10 microns.

20. A process as claimed in claim 19 wherein said other component has a particle size less than 1 micron.

21. A process as claimed in claim 16 wherein the weight ratio of said other component to polytetrafluoroethylene is 10:1 to 1:10.

22. A process as claimed in claim 21 wherein said weight ratio is 2:1 to 1:2.

23. A process as claimed in claim 10 wherein the diaphragm is provided with a strengthening support.

24. A process as claimed in claim 23 wherein the support is a sheet of polymer gauze.

25. A process as claimed in claim 24 wherein the support is a polypropylene gauze.

26. A process as claimed in claim 1 wherein the working electrolyte is an alkali metal chloride brine.

27. A process as claimed in claim 26 wherein the working electrolyte is sodium chloride brine.

28. The process of claim 1, wherein said additive has a particle size within the range between 5 to 100 microns.

29. A process as claimed in claim 1, wherein the solid particulate additive is starch, cellulose or cellulose or cellulose acetate.

30. A process as claimed in claim 1, wherein the solid particulate additive is a water-insoluble inorganic base or carbonate.

31. A process as claimed in claim 30, wherein the solid particulate additive is calcium carbonate.

* * * * *

UNITED STATES PATENT AND TRADEMARK OFFICE
CERTIFICATE OF CORRECTION

PATENT NO. : 4,098,672

DATED : July 4, 1978

INVENTOR(S) : David Stephen Riley

It is certified that error appears in the above-identified patent and that said Letters Patent are hereby corrected as shown below:

Item [30] of Patent Heading should read:

--[30] Foreign Application Priority Data

Jul. 18, 1973 [GB] United Kingdom....34168/73--

Signed and Sealed this

*Thirteenth* Day of *February 1979*

[SEAL]

*Attest:*

RUTH C. MASON
*Attesting Officer*

DONALD W. BANNER
*Commissioner of Patents and Trademarks*